US008165911B1

(12) United States Patent
Sanil et al.

(10) Patent No.: US 8,165,911 B1
(45) Date of Patent: Apr. 24, 2012

(54) MARKET MATURITY OPTIMIZATION OF WEB-BASED SERVICE

(75) Inventors: Ashish Sanil, Foster City, CA (US);
Diane L. Tang, Portola Valley, CA (US);
Nicholas C. Fox, Foster City, CA (US);
Avichal Garg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 741 days.

(21) Appl. No.: 11/953,214

(22) Filed: Dec. 10, 2007

Related U.S. Application Data (60) Provisional application No. 60/983,744, filed on Oct. 30, 2007.

(51) Int. Cl.
*G06Q 30/00* (2012.01)
(52) U.S. Cl. .................................................... 705/7.34
(58) Field of Classification Search .................. 705/7.34
See application file for complete search history.

(56) References Cited

U.S. PATENT DOCUMENTS

| | | | | |
|---|---|---|---|---|
| 2004/0267612 | A1* | 12/2004 | Veach | 705/14 |
| 2005/0021528 | A1* | 1/2005 | Andreev | 707/100 |
| 2005/0216547 | A1* | 9/2005 | Foltz-Smith et al. | 709/200 |
| 2008/0071594 | A1* | 3/2008 | Morin | 705/7 |
| 2008/0103903 | A1* | 5/2008 | Flake et al. | 705/14 |
| 2008/0177588 | A1* | 7/2008 | Abbott et al. | 705/7 |

OTHER PUBLICATIONS

Chandrasekaran, Deepa, Essays on the Turning Points of the Product Life Cycle, University of Southern California, May 2007.*
Dino, Richard N., "Forecasting the Price Evolution of New Electronic Products," Journal of Forecasting, Jan.-Mar. 1985, vol. 4, pp. 39-60.*

* cited by examiner

*Primary Examiner* — Nathan Erb
(74) *Attorney, Agent, or Firm* — Fish & Richardson P.C.

(57) ABSTRACT

Historical web-based service performance metric values and the historical web-based standards are analyzed to determine maturity classifications for a plurality of regions over a time period. The historical web-based standards applied to each of the regions at different times within the time period are compared, and current web-based standards for one or more regions are adjusted based on the comparison to improve web-based service performance in the one or more regions.

20 Claims, 7 Drawing Sheets

MARKET MATURITY OPTIMIZATION OF WEB-BASED SERVICE

The Application claims the benefit of U.S. Provisional Application Ser. No. 60/983,744, filed on Oct. 30, 2007, the entire disclosure of which is incorporated herein by reference.

FIELD OF THE INVENTION

The systems and methods described herein generally relate to web-based service systems.

BACKGROUND

The rise of the Internet has enabled access to a wide variety of content items, e.g., video and/or audio files, web pages for particular subjects, news articles, advertisements etc. Such content items of particular interest to a user can be identified by a search engine and/or an advertising system in response to a user query. One example search engine is the Google search engine provided by Google Inc. of Mountain View, Calif., U.S.A. The query can include one or more search terms or phrases, and the search engine can identify and, optionally, rank the content items based on the search terms or phrases in the query and present the content items to the user (e.g., in order according to the rank).

An example advertising system is the Google Adwords™ system. The Adwords™ system can compare a user query submitted to the Google search engine to a list of keywords specified by an advertiser and provide targeted ads that are relevant to the query of the user. Similarly, the AdSense™ system can identify the content of a web property (e.g., a web page) of a third party online publisher and deliver advertisements that are relevant to the content, and thus likely of interest to users viewing the web property. Other advertising and searching systems can also be used.

Various on-line metric values with respect to content items such as search results and advertisements can be measured, such as clicks, click-through rates, conversions, conversion rates, quality, etc. These metric values can be used to tune the performance of search engines and/or advertising systems by establishing standards and performance requirements. For example, an advertisement with a very high click-through rate for a query may be determined to be more relevant to the query than an advertisement with a very low click-through rate for the query. Similarly, an advertisement that does not meet a minimum quality value may be precluded from auction, or a minimum cost associated with the advertisement (e.g., a minimum cost per click) may be increased in substantially inverse proportion to the quality value.

While tuning the performance of the search engine or the advertising system on such metric values may optimize performance for certain markets, e.g., the United States, Canada and the United Kingdom, such tuning may not necessarily optimize the performance for other markets, e.g., Italy, France, the Pacific Rim countries, etc. Different markets, e.g., countries and regions, can be unique for a variety of different reasons, such as economically, technologically, culturally, socially, politically, geographically, etc. For example, merely increasing a quality threshold without considering other system parameters may result in showing higher quality advertisements; however, a particular country may have an advertising base in which very few advertisers have such high quality advertisements. Thus, while the desired result of showing higher quality advertisings may be achieved, the result may nevertheless severely impact the advertising market, as the quality requirement may inadvertently cause a barrier to entry into the on-line advertising market.

Accordingly, it can be difficult to understand how to adjust standards and other performance parameters for the different markets that result in the selection of higher quality advertisements without adversely impacting revenue in the long term. If the negative long term revenue effects can be minimized, or positive long term revenue effects can be realized, then higher quality requirements for advertisements can be implemented. The showing of the higher quality advertisements can, in turn, lead to greater audience trust.

SUMMARY

In general, aspects of the subject matter of this specification facilitate the optimization of a web-based advertisement system for one or more regions. Examples of such regions can include countries and/or markets. In an implementation, web-based market metric values for a plurality of regions are determined. The web-based market metric values relate to a web-based service provided in the regions. The regions are clustered into market clusters based on the web-based market metric values of the regions. A cluster transition for a region is identified. The cluster transition defines a transition of the region from a first cluster to a second cluster. Market-specific changes for the region alter the web-based market metric values for the region so that the region undergoes the cluster transition.

In another implementation, web-based market metric values for a plurality of regions are determined. The web-based market metric values measure performance of a web-based service provided in the regions. The regions are categorized according to a maturity classification for each of the regions. Market-specific changes are implemented for one or more of the regions. The market-specific changes for each of the regions are based on the maturity classification of the region, and alter the web-based market metric values for the one or more regions so that the performance of the web-based service in the one or more regions is increased.

In another implementation, web-based advertisement market metric values associated with a plurality of countries are analyzed, and maturity classifications for each of the countries over a time period based on the web-based advertisement market metric values are determined. Web-based advertising standards applied to each of the countries at different times within the time period are compared, and web-based advertising standards for one or more of the countries are adjusted based on the comparison.

In another implementation, one or more market factors related to a plurality of regions are analyzed, and maturity classifications for each of the regions over a time period based on the one or more market factors are determined. Market standards for each of the regions over the time periods are compared, and the market standards for a region are adjusted based on the comparison to increase web-based advertising performance for the region.

In another implementation, a system includes a data store and a market maturity engine. The data store stores historical web-based service performance metric values and historical web-based standards for a plurality of regions. The market maturity engine analyzes the historical web-based service performance metric values and the historical web-based standards to determine maturity classifications for each of the regions over a time period, compares the historical web-based standards applied to each of the regions at different times within the time period, and adjusts current web-based standards for one or more regions based on the comparison to improve web-based service performance in the one or more regions.

The details of one or more embodiments of the invention are set forth in the accompanying drawings and the description below. Other features, objects, and advantages of the invention will be apparent from the description and drawings, and from the claims.

DETAILED DESCRIPTION

§1.0 Example Online Environment

Figure 1:
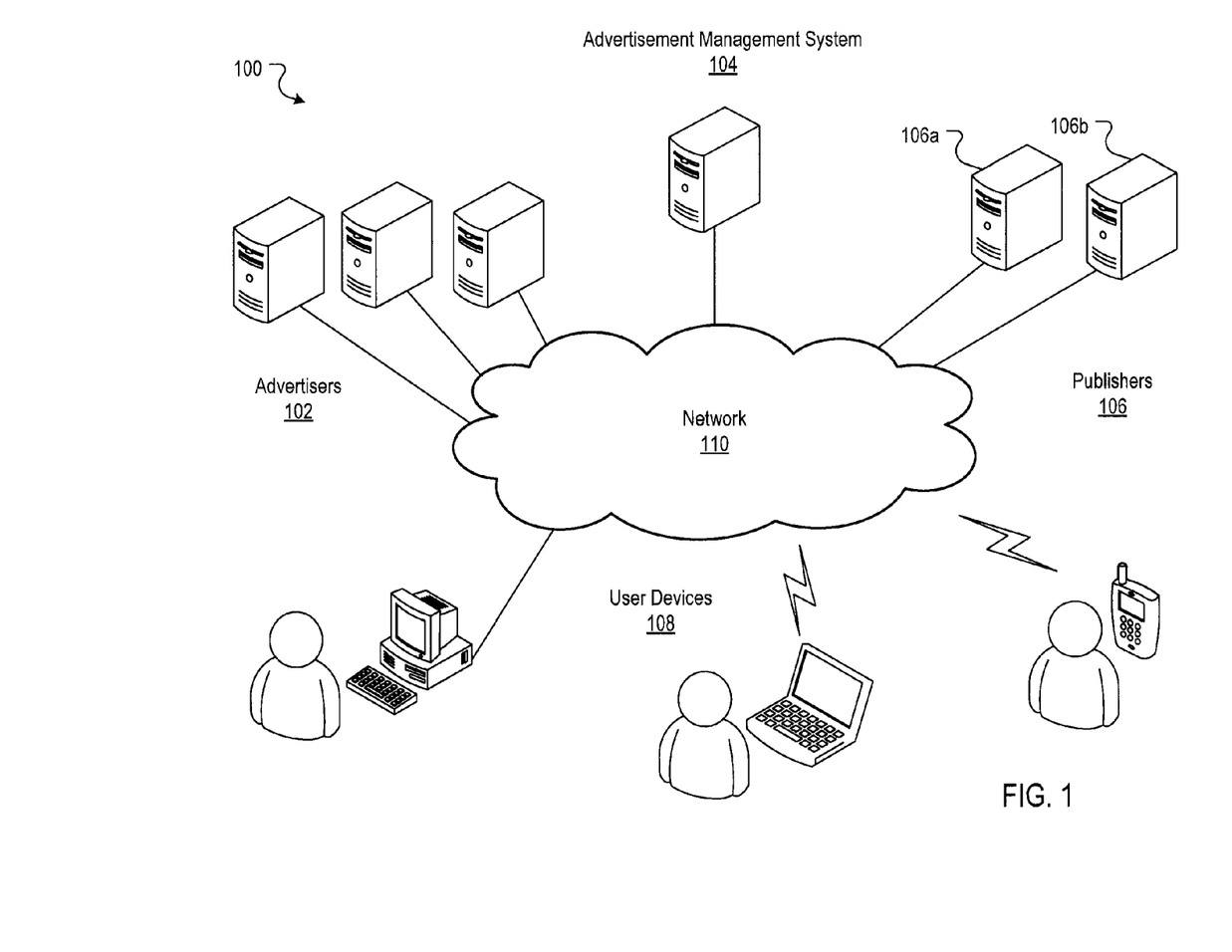
FIG. 1 is a block diagram of an example online environment.

FIG. 1 is a block diagram of an example online environment 100. A computer network 110, such as a local area network (LAN), wide area network (WAN), the Internet, or a combination thereof, connects advertisers 102, an advertisement management system 104, publishers 106, and user devices 108. The advertisers 102, advertisement management system 104, and the publishers 106 can facilitate the identification and serving of content items, e.g., web pages, advertisements, etc., to the user devices 108.

In some implementations, the advertisers 102 can directly, or indirectly, enter, maintain, and track advertisement information in an advertising management system 104. Though reference is made to advertising, other forms of content, including other forms of sponsored content, can be delivered by the system 100. The advertisements may be in the form of graphical advertisements, such as banner advertisements, text only advertisements, image advertisements, audio advertisements, video advertisements, advertisements combining one or more of any of such components, etc. The advertisements may also include embedded information, such as links, meta-information, and/or machine executable instructions. One or more publishers 106 may submit requests for advertisements to the system 104. The system 104 responds by sending advertisements to a requesting publisher 106 for placement on or association with one or more of the publisher's content items (e.g., web properties). Example web properties can include web pages, television and radio advertising slots, and even print media space. The advertisements can include embedded links to landing pages, e.g., pages on the advertisers 102 websites that a user is directed to when the user interacts with (e.g., clicks) an advertisement.

One example publisher 106 is general content server 106a that receives requests for content (e.g., articles, discussion threads, music, video, graphics, search results, web page listings, information feeds, etc.), and retrieves the requested content in response to the request. The content server 106a may submit a request for advertisements to an advertisement server in the system 104. The advertisement request may also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information of a requesting device 108, etc. In some implementations, the content server 106a or a client browser can combine the requested content with one or more of the advertisements provided by the system 104. The combined content and advertisements can be sent/rendered on the user device 108 that requested the content for presentation in a viewer (e.g., a browser or other content display system).

Another example publisher 106b is a search service 106b. The search service 106b can receive queries from the user devices 108 for search results. In response, the search service 106b can derive relevant search results from an index of documents (e.g., from an index of web pages). An exemplary search service 106b is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results. The search results can be provided to the requesting user device 108. The search results can include embedded links landing pages, e.g., pages on websites that a user is directed to when the user clicks on the search resulted presented on the user device 108.

In some implementations, the search service 106b can submit a request for advertisements to the advertising management system 104. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores, page rank scores, etc.), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

The search service 106b can combine the search results with one or more of the advertisements provided by the system 104. This combined information can then be forwarded to the user device 108 that requested the content. The search results can be maintained as distinct from the advertisements, so as not to confuse the user between paid advertisements and presumably neutral search results.

In one implementation, the advertisement management system 104 may include an auction process to select advertisements from the advertisers 102. For example, the advertisers 102 may be permitted to select, or bid, an amount the advertisers are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an advertisement based on a keyword, e.g., a word or words in a query. Other bid types, however, can also be used. Based on these bids, advertisements can be selected and ranked for presentation.

The search service 106b can combine the search results with one or more of the advertisements provided by the system 104. This combined information can then be forwarded to the user devices 108 that requested the content. The search results can be maintained as distinct from the advertisements, so as not to confuse the user between paid advertisements and presumably neutral search results.

Various metric values with respect to the search results and content items can be measured, such as clicks, long clicks, click-through rates, conversions, conversion rates, etc. A click occurs when a user of a user device selects a search result or advertisement, e.g., by placing a cursor over the search result or advertisement and entering a selection command, such as a mouse click. A long click can occur if the user of the user device dwells on a landing page associated with the search result or advertisement in excess of a certain period of time, or clicks on another page within the domain of the landing page, or upon the occurrence of some other event defining a long click.

The click-through rate is a performance metric value that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metric values can also be used.

A "conversion" occurs when a user consummates a transaction related to a previously served advertisement. What constitutes a conversion may vary from case to case and can be determined in a variety of ways. For example, a conversion may occur when a user clicks on a creative, is referred to the advertiser's Web page, and consummates a purchase there before leaving that Web page. Alternatively, a conversion may be defined as a user being shown a creative, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product or service inquiry, etc. The conversion rate may be defined as the ratio of the number of conversions to the number of times the advertisement is displayed.

§2.0 Market Performance Adjustments

Such metric values as described above can be used to adjust the rankings of content items such as search results and advertisements. For example, content items having very few long clicks, or low click-through rates, and/or low conversion rates can be interpreted as having poor quality content. In some implementations, the advertisement management system 102 and/or the search service 106b can base the ranking of content items in part on a quality metric value associated with the content item. For example, an advertisement may have a minimum bid requirement increased if the advertisement is deemed to be of low quality, or a search result may be deemed less relevant to a query if the search result is deemed to be of low quality. Thus, content items with low quality measurements may be ranked lower than content items having higher quality measurements.

While tuning the performance of the advertisement management system 102 and/or the search service 106b may optimize performance for certain markets, e.g., the United States, Canada and the United Kingdom, such tuning may not necessarily optimize the performance for other markets, e.g., Italy, France, the Pacific Rim countries, etc.

Rather than attempting to optimize system performance for all regions uniformly, regions can instead be categorized according to a maturity classification, e.g., a market maturity, and market-specific changes for a maturity classification of a particular region can be implemented for a particular region. In an implementation, the markets can be defined by web-based market metric values, e.g., click-through rates, conversion rates, cost per actions, etc. A comparison of performance of regions in different markets can be made, and market-specific changes can be selected based on the comparison to alter the web-based market metric values for a region so that the performance of a web-based service e.g., an advertisement service, in the region is increased.

2.1 Market Specific Changes

Figure 2A:
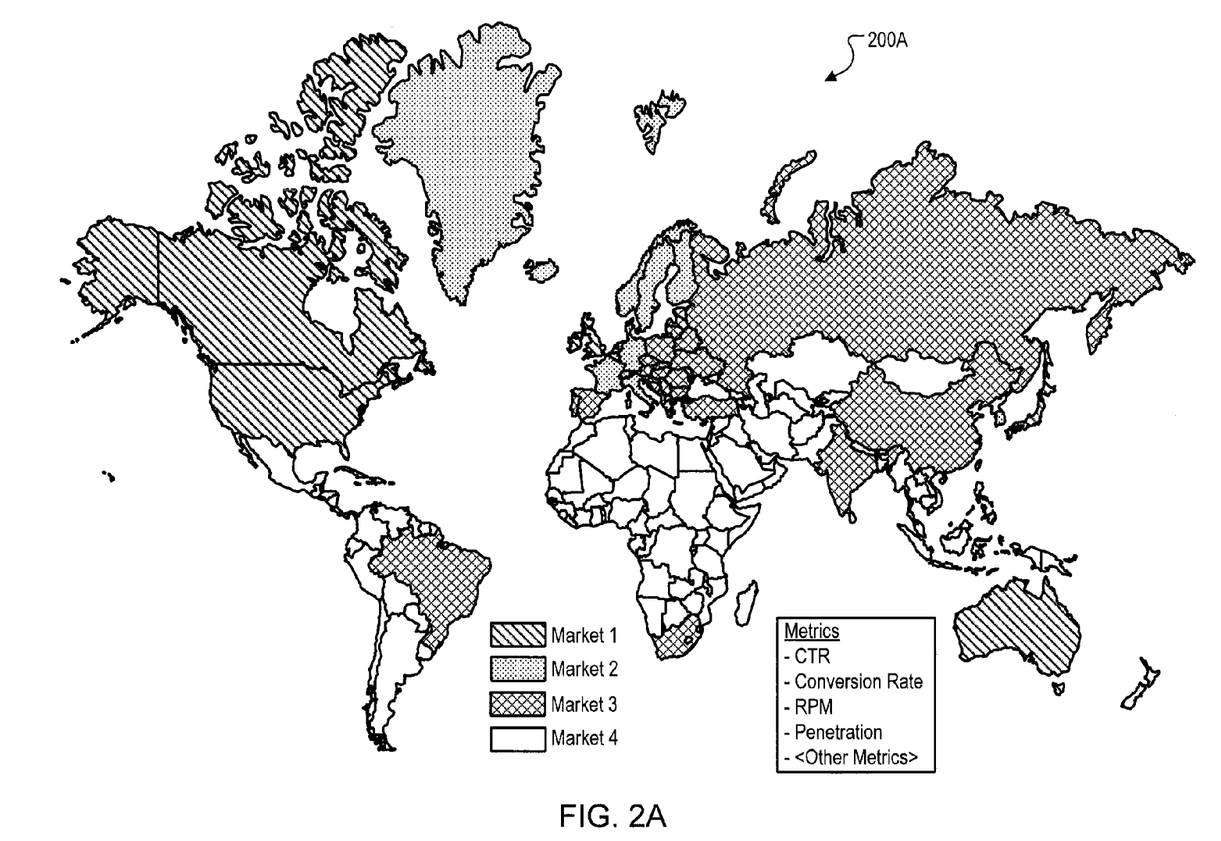
FIGS. 2A and 2B are maps of example markets at first and second times, respectively.
Figure 2B:
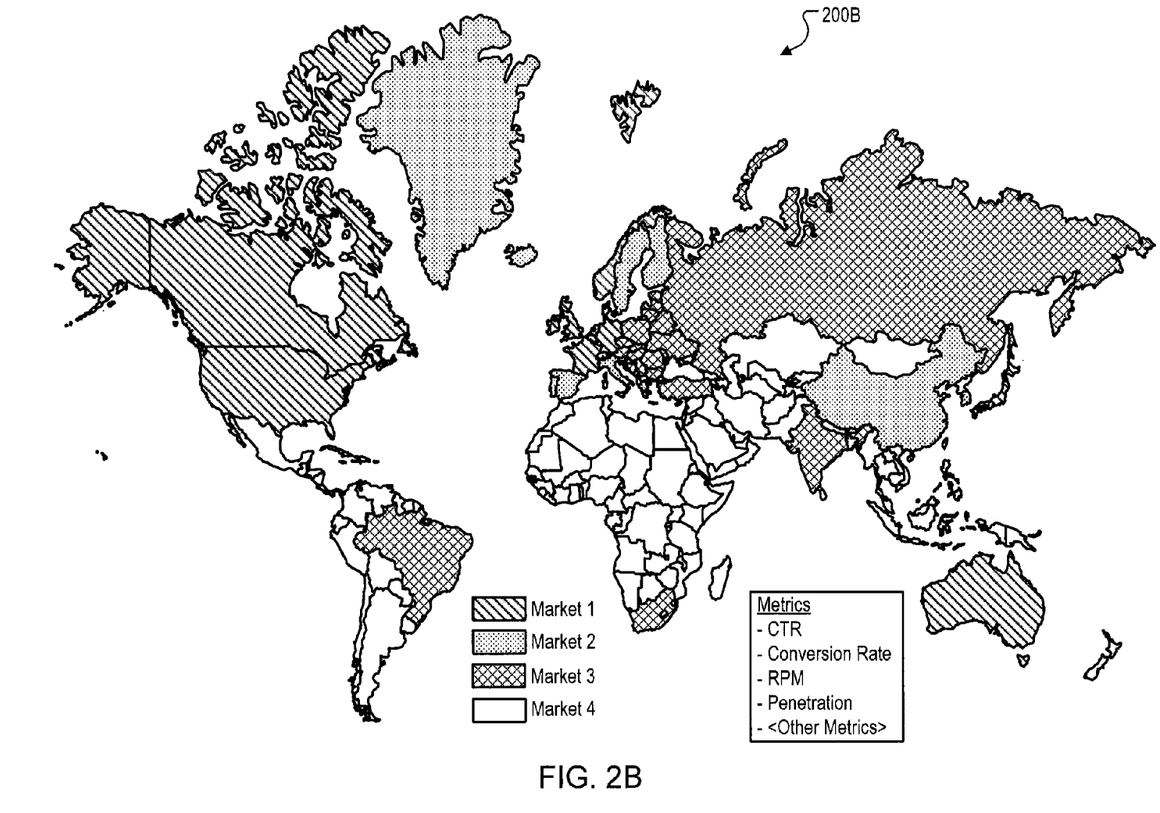

FIGS. 2A and 2B are maps of example markets at first and second times, respectively, and illustrate the effects of implementing market-specific changes. FIG. 2A is a map 200A of four markets that are defined by web-based market metrics, such as click-through rates, conversion rates, revenue rates, revenue per action (RPM), computer web access penetration, and, optionally, other web-based market metrics. These web-based market metric values can be selected to measure the relative performance of web-based services, e.g., advertising and information retrieval, in the regions.

In an implementation, the web-based market metric values can be determined for all content items served in each of a plurality of regions, e.g., countries. For example, an aggregate of the web-based market metric values can be determined for each country, and each country can be grouped with other countries having similar web-based marketing metric values. Thus, at a first time period, the countries may be categorized according to four levels of market maturity, e.g., Market 1, Market 2, Market 3 and Market 4. By way of example, Market 1 may be a leader market, e.g., a market for which the web-basket metric values indicate the highest performance relative to the other markets. Likewise, Market 2 may be a mature market, e.g., a market for which the web-basket metric values indicate a second-highest performance relative to the other markets. An emerging market, Market 3, and a developing market, Market 4, can likewise be identified.

Generally, while the penetration of web access in each region increases over time, so too will revenue values, the volume of web traffic, etc., increase in each region. However, the relative performance of the markets may remain similarly distributed. For example, the relative performance measure of web-based gross revenue per capita in a particular region in Market 1 to regions in Markets 2, 3 and 4 may remain relatively unchanged over time.

A comparison of performance of regions in different markets at different times can be made to identify market-specific changes that can be implemented in a particular region or market. For example, if a current performance level of a first country in Market 2 is near or at a past performance level of a second country in a Market 1, changes previously implemented in the second country in Market 1 can be analyzed to determine whether such changes are now feasible for the first country in Market 2. Accordingly, implementing market-specific changes based on a market maturity can be used to transition a region, e.g., a country, from a lower-performing market to a higher performing market.

Example transitions are illustrated in FIG. 2B, which is a map 200B of the four markets defined by web-based market metric values at a later time, e.g., several years later or more. By implementing the market-specific changes in France, Germany and Norway at an earlier time (e.g., shortly after the time that data are collected to identify the markets of FIG. 2A), an increase in web-based service performance in those countries is indicated by the web-based market metric values. For example, after several years, the countries of France, Germany and Norway have transitioned from Market 2 to Market 1. Similarly, market-specific changes implemented in China, Portugal and Spain cause those countries to transition from Market 3 to Market 2.

A variety of market-specific changes can be implemented, and such changes can depend on the region (e.g., country or continent) and the market maturity (e.g., a developing market, an emerging market, a mature market, and a leading market). In some implementations, the market-specific changes can be either internal system changes or external system changes.

Internal system changes are, for example, changes implemented within the advertising system and/or search engine, such as adjustments to quality factors and bidding requirements for serving advertisements. For example, a developing market may have a relatively small advertising base and advertisers that are relative novices in web-based advertising. Thus removing barriers to serving of advertisements for a geographic location may result in an increased number of relevant advertisements being presented to the users in the geographic location. Accordingly, an internal system change can include removing a quality component for advertisement bidding or search result ranking for a particular country code top level domain.

Similarly, the economy of the particular country may require a pricing model change for bidding on keywords if the current keyword bidding prices are cost prohibitive for advertisers within the country. Thus, in some implementations, advertisers within the country may be afforded a reduced keyword bidding price when competing for keywords with advertisers from other countries, such as the United States, Canada, and Australia, for example. In other implementations, however, the keyword bidding price can be reduced with respect to the currency of the auction. For example, an auction that includes Chinese advertisers, United States advertisers, and United Kingdom advertisers advertising in China will treat the United States and the United Kingdom advertisers as Chinese advertisers in that auction, e.g., the bidding requirements will be the same for each advertiser regardless of domestic origin.

Other internal system changes can include changes that are tailored to particular cultures or languages. For example, in the United States, advertisements that are deemed to be highly performing can be promoted in a conspicuous location above a list of search results in a search engine interface. Such promotions are based on the assumption that the highly performing advertisements are very relevant to the interests of the users submitting a relevant query, and presenting the advertisements by promotion can thus enrich the user experience and further increase the click-through rate and conversion rate for the advertiser. However, in other countries, such promotion may not realize any increase in the click-through rate and conversion rate for the advertiser due to a cultural difference, e.g., the presentment of advertisements in such a promoted manner may be deemed mildly offensive in a particular culture. Accordingly, promotion of advertisements in such regions can be disabled.

By way of another example, a language model for a particular language, e.g., English, may facilitate keyword expansion to broaden search queries submitted in the particular language. However, another language model used for another language, e.g., Hebrew, may not readily facilitate keyword expansion, e.g., such expansions may often yield keywords that are not relevant to a user's original query, which, in turn, may result in many irrelevant search results and advertisements. Accordingly, keyword expansion in those languages for which language models do not perform well can be disabled.

External system changes are, for example, changes that are implemented external to the advertising system or search engine. For example, a first country in an established market may have similar social and economic standards to a second country in a leading market. However, the cost of Internet access may be very high in the first country relative to the second country, e.g., the first country may impose a heavy tax on broadband access. Thus, a company offering web-based search and advertising service may also offer an initial internet access subsidy to users in the first country, e.g., a 100% tax subsidy for a first year of access, and a 50% subsidy for a second year of access, etc., to generate an immediate increase in Internet access penetration. By increasing access penetration, a larger advertising audience can be made available for advertisers in the first country. Additionally, the increased penetration could lead to increased awareness of the benefits of Internet access, which could lead to legislative initiatives to repeal or reduce the tax burden in the first country.

The example internal system changes and external system changes described above are illustrative and not exhaustive. Such market-specific changes can increase the performance of the web-base services which can result in a transition of a region from a less mature market to a more mature market.

2.2 Market Growth Curves

Figure 2C:
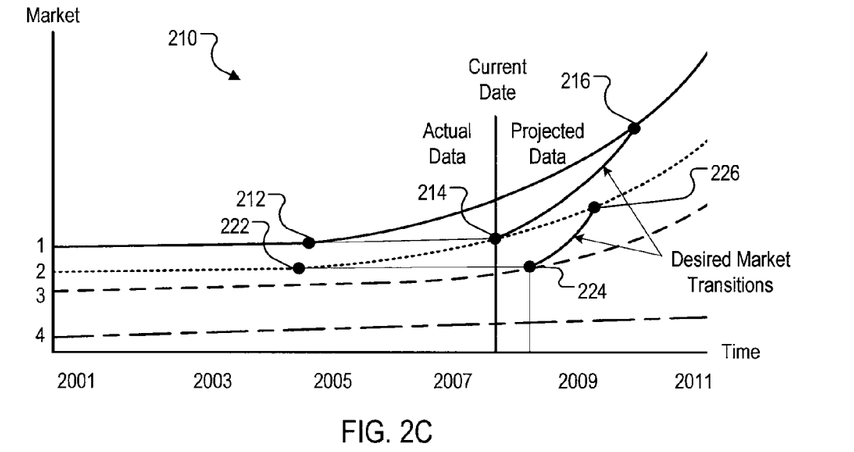
FIG. 2C is an example growth curve of the markets of FIGS. 2A and 2B.

Such a transition can manifest in changes in the web-based market metric values for the region, as illustrated in FIG. 2C, which is an example growth curve 210 of the markets of FIGS. 2A and 2B. The growth curve 210 can be based on the web-based market metric values for particular regions, e.g., based on a function of click-through rates, conversion rates, revenue per action, and other web-based market metrics for each of the countries shown in the maps 200A and 200B.

The web-based market metric values used to generate the growth curves of FIG. 2C can include actual data up to a current date, and can also include projected data up to a future date. A variety of known estimation algorithms can be used to generate the projected data, such as numerical method algorithms, e.g., interpolation algorithms, polynomial curve fit algorithms, etc., and statistical algorithms, such as Bayesian methods, etc.

In some implementations, the growth curves can be generated by a function of the web-based market metric values of similarly performing regions. Example functions can include aggregation and/or central tendency determination, e.g., averages, etc. For example, the market metric values for the United States, Canada, the United Kingdom, and Japan may be substantially similar, and thus average growth curve for these countries can be generated for Market 1. A similar process can be used to generate the growth curves for Markets 2, 3 and 4.

In an implementation, the growth curve data can facilitate the implementation of market-specific changes for a region based on the maturity level of the region. For example, as illustrated in FIG. 2C, the web-based market metric values indicate that the performance of Market 1 at a first time 212, e.g., near the end of 2004, was substantially similar to the current performance of Market 2 at a second time 214, e.g., near the end of 2007. Accordingly, a particular region in Market 2 can be selected and market-specific changes for the region can be implemented that cause the region to transition from Market 2 to Market 1. For example, the only web-based market metric value of a first country in Market 2 that significantly differs from the countries in Market 1 may be a click-through rate. Thus, implementing market-specific changes for the first country that cause the click-through rate to increase may, in turn, cause the first country to undergo a market transition, i.e., transition from the cluster of countries in Market 2 to the cluster of countries in Market 1.

Identifying the market-specific changes to apply to the first country can be done in a variety of ways. In some implementations, changes that were implemented in a first country at a past time and at a similar performance level, e.g., time 212, which caused an improvement in a corresponding metric value, e.g., the click-through rate, can be identified. For example, in the countries of Market 1 at the time 212, a quality-based bidding algorithm for advertisements may have been implemented, which resulted in an improvement in overall click-through rates for advertisements. However, the quality based-bidding algorithm may not have been implemented in the countries of Market 2 at the time 212, as other market factors in those countries at that time, e.g., economic conditions, Internet penetration, etc. may have warranted against applying a quality-based bidding algorithm. However, at the current time, i.e., time 214, Market 2 may be performing at the relative level that Market 1 was performing at the time 212. Accordingly, implementing the quality-based bidding algorithm in the first country at time 214 may, in turn, cause the first country to transition to the first market at a later time, e.g., by time 216.

A similar change can also be implemented at an estimate time in the future, e.g., upon the performance level of Market 2 at past time 222 being achieved by Market 3 at a future time 224, market-specific changes can be implemented that cause a country in Market 3 to transition to Market 2 at a later time 226.

Market-specific changes can also be identified by other processes. In some implementations, for example, the web-based market metric values can be processed to determine whether an internal system change is required. For example, the only web-based market metric values of a first country in Market 2 that may significantly differ from the countries in Market 1 may be a click-through rate and conversion rate. Such differences may, for example, indicate that an advertising system is serving less relevant advertisements to the first country in Market 2, or is presenting advertisements in a manner that decreases selections. Accordingly, a language model specific to the first country may be adjusted, or an adjusted advertisement presentation scheme specific to the first country may be implemented.

§2.3 Evaluation Of Market Specific Changes

After a market-specific change is implemented for a region, the performance of the region can be measured to determine if the market-specific change is achieving a desired result. In some implementations, revenue for a region can be monitored as a measure of performance.

Figure 2D:
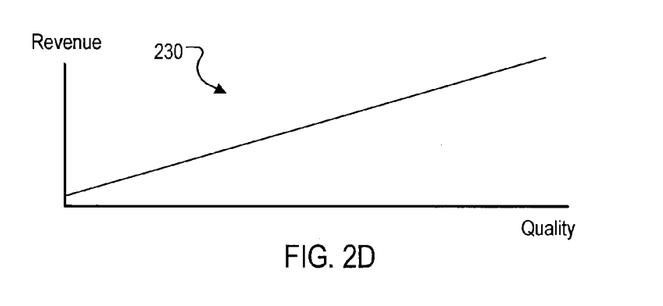
FIG. 2D is a graph of an example ideal system response to quality changes as measured by revenue.

By way of example, FIG. 2D is a graph 230 of an example ideal system response to quality changes as measured by revenue. In such an ideal system, changes to one or more variables will cause a quantifiable change to a performance measure. Thus, changes to one or more system parameters that increase quality factors, which will result in the selection and serving of higher performing advertisements, will likewise cause an increase in revenue generation. Although an example linear relationship between revenue and quality is shown, other system models can also be used, e.g., exponential relationships, logarithmic relationships, etc.

Figure 2E:
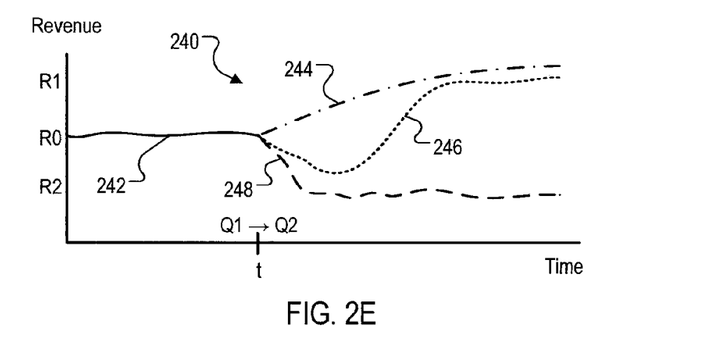
FIG. 2E is a graph of example revenue and quality curves in response to a quality change.

FIG. 2E is a graph 240 of example revenue and quality curves in response to a quality change. The graph 240 illustrates non-ideal system responses over time to a change in system parameters that increase quality factors from Q1 to Q2. The monitoring of the system response can be used to determine whether a market-specific change is achieving a desired result.

As shown in the graph 240, a system is generating revenue at a rate of R0 for initial quality factors Q1, as indicated by the revenue line 242. At a time t, a change in system parameters that increase quality factors from Q1 to Q2 is implemented. Such a change can, for example, include the implementation of a quality-based bidding algorithm; or minimum bidding requirements based on click-through rates; or other quality related changes.

The non-ideal system can respond to such a change in a variety of ways, three of which are illustrated by the revenue lines 244, 246 and 248. The revenue line 244 indicates a very successful response in which revenue begins to immediately increase from the initial value R0 to a final value of approximately R1. The revenue line 246 also indicates a successful response in which revenue increases from the initial value R0 to the final value of approximately R1. However, the revenue line 246 also indicates that an initial revenue drop in response to the increase in quality factors. The initial revenue drop can be attributed to a variety of causes, e.g., time for advertisers to adjust to the new quality parameters; time for the system changes to take effect; time for the users to respond to changes in advertisements being presented; etc. Accordingly, in response to observing either of the successful responses indicated by the revenue lines 244 or 246, the changes to the quality factors may be permanently implemented.

The revenue line 248, however, indicates an unsuccessful response in which revenue decreases from the initial value R0 to a final value of approximately R2. The revenue decrease can be attributed to a variety of causes, e.g., advertisers in the market are unable adjust to the new quality parameters; the users do not respond positively to changes in advertisements being presented; the changes in quality factors result in cost-prohibitive bidding requirements and thus the advertisers are presented with a barrier to entry; etc. Accordingly, as a result of observing the unsuccessful response indicated by the revenue line 248, quality factors may be further adjusted; or may be gradually "stepped" to eventually arrive at the final quality factors Q2; or may revert to the initial quality factors Q1.

Although revenue has been illustrated as a metric that can be monitored to determine if an implemented change is achieving a desired result, other metrics can also be used. For example, click-through rates, conversion rates, or any other measurable system response, or combination of system responses, can be measured to determine if an implemented change is achieving a desired result.

§3.0 Example Market Clustering

Figure 3:
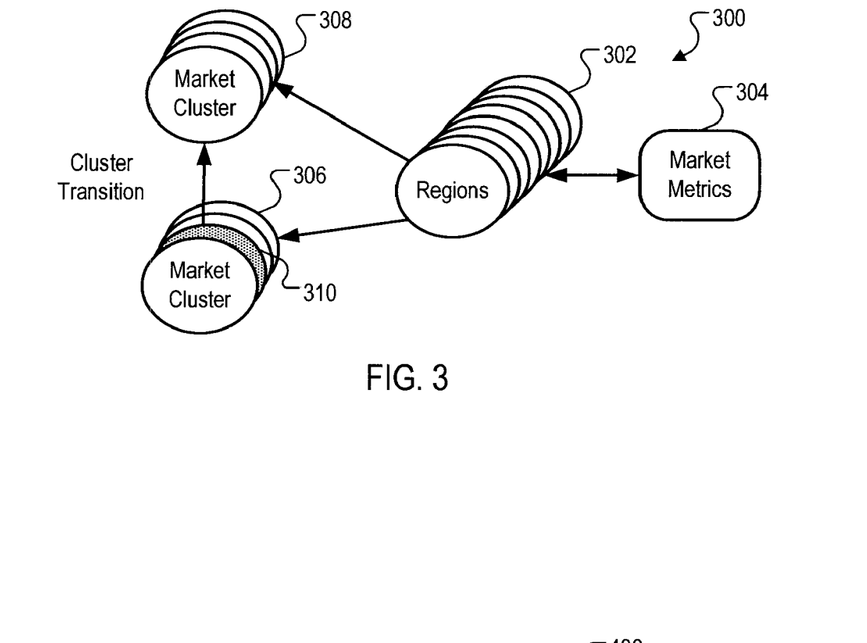
FIG. 3 is a block diagram of an example web-based market clustering.

FIG. 3 is a block diagram of an example web-based market clustering 300. The clustering 300 can, for example, be used to facilitate the identification of markets and clustering regions, e.g., countries, into the markets. Web-based market metric values 304 can be determined for a plurality of regions 302. The web-based market metric values 304 can relate to a web-based service provided in the regions, e.g., an advertising service provided in various countries.

The regions 302 can be clustered into market clusters, e.g., clusters 306 and 308, based on the web-based market metric values 304. For example, if the metric values 304 relate to web-based service click-through rates, web-based service conversion rates, and web-based service revenue rates, then the regions can be clustered based on a common trait of the click-through rates, conversion rates, and revenue rates.

A variety of clustering algorithms can be used, such as k-means clustering, quality threshold clustering, etc. Other classification and categorization algorithms that associate the regions according to one or more common traits can also be used instead of a clustering algorithm. Furthermore, although only two clusters are shown, more clusters can also be generated, e.g., country clusters for the markets 1-4 of FIGS. 2A-2C.

Once the market clusters 306 and 308 are identified, a cluster transition for a region can likewise be identified. The cluster transition can define a transition of a region from a first cluster, e.g., region 310 in market cluster 306, to a second cluster, e.g., cluster 308. For example, as described with reference to FIGS. 2C and 2E, a cluster transition from Market 2 to Market 1 can be identified as an objective to be achieved for a first country in Market 2, e.g., an increase in revenue, or some other measured parameter.

To achieve the identified cluster transition, market-specific changes for the region can be implemented. In one particular implementation, the market-specific changes are selected to alter the web-based market metric values 304 for the region 310 so that the region undergoes the cluster transition from the market cluster 306 to the market cluster 308. For example, implementing the market-specific changes for the market of the first country at the time 214 can cause country to transition to Market 1 at the time 216. Progress can thereafter be monitored by measuring performance metrics, such as described with reference to FIG. 2E.

Although countries have been provided as example regions, other types of regions can also be used. For example, regions can be defined according to groups of countries, e.g., Western Europe, Eastern Europe, North America, etc., or regions based on languages, e.g., predominately English-speaking countries, predominately Spanish-speaking countries, etc., or according to other political, social and/or economic differences or similarities.

§4.0 Example System Implementation

Figure 4:
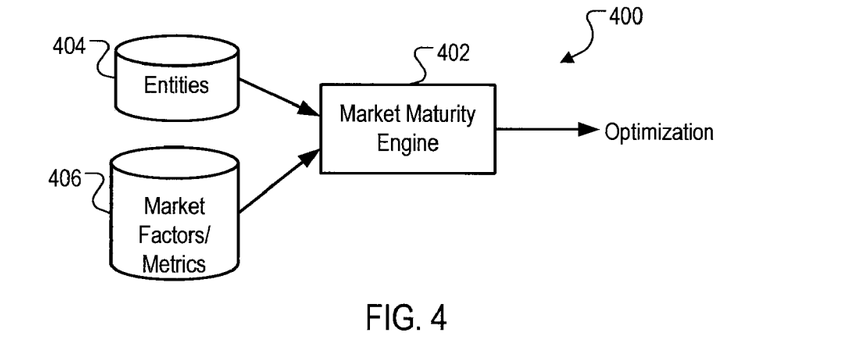
FIG. 4 is a diagram of an example web-based market maturity system.

FIG. 4 is a diagram of an example web-based market maturity system 400. The system 400 can be used to perform the market clustering of FIG. 3, to identify market cluster transitions, and to implement market-specific changes to realize the market cluster transitions. The system 400 can include a market maturity engine 402, an entities data store 404, and a market factors/metrics data store 406.

In one implementation, data related to different entities can be stored in the entities data store 404. For example, the entities data store 404 can include data for all of the countries that receive data from and provide data to a web-based service. Furthermore, the entities data store 404 can associate each country with a region, language, etc. For example, the United States can be associated with a North American region market and an English-speaking language market, as well as an individual country. In addition, one or more regions can be defined based on economic factors and other country characteristics, such as population, technology access, etc.

Data related to web-based market metrics (e.g., click-through rates, etc.) and other market factors (e.g., gross domestic product, population, per capita income, etc.) can be stored in the market factors/metrics data store 406 and associated with different entities. For example, the market factors/metrics data store 406 can store market factors related to the different countries or other regions, such as regions classified by geography, economic factors, language, etc.

The market maturity engine 402 can analyze one or more market factors/metrics related to an entity. The entity can include a region, a country, a language, etc. In some implementations, the entities can be clustered into market clusters, such as shown and described with reference to FIG. 3 above. The market maturity engine 402 can be integrated in a search engine, such as the search service 106b, or an in advertising system, such as the advertisement management system 104.

Other categorization techniques can also be implemented. In some implementations, for example, markets can be pre-defined and analyzed. For example, the market maturity engine 402 can analyze market factors/metrics for markets that include particular countries, such as the United States, China, Norway, etc. By way of another example, the market maturity engine 402 can analyze market factors for a market that includes a particular region, such as Western Europe, Middle East, etc. In another implementation, the market maturity engine 402 can analyze market factors for a market that can include multiple countries that speak the same language. For example, all English-speaking countries, such as the United States, United Kingdom, Canada, Australia, etc., can be analyzed as a single market.

In some implementations, the market maturity engine 402 can determine a maturity classification for the entity based on the one or more market factors. Determining a maturity classification for the entity can, for example, include determining a maturity score of the entity based on the one or more market factors related to the entity and related to other entities. For example, values for the market factors/metrics may be normalized with reference to an entity or entities having market factors/metric values indicating a highest performance.

Based on the maturity score, the market maturity engine 402 can classify a market to which the entity belongs. For example, the maturity classifications can include leader, mature, established, and emerging. The maturity classifications can be associated with a particular range of maturity scores. Other maturity classifications can also be used, including different classifications and more or less classifications.

The market maturity engine 402 can thereafter identify market-specific changes for an entity to improve the performance of a web-based service for that entity. For example, historical web-based standards applied to a plurality of regions, e.g., countries, at different times can be compared, and the market maturity engine 402 can adjust current web-based standards for one or more of the regions based on the comparison to improve web-based service performance in the one or more regions. Thereafter, progress can be monitored by measuring performance metrics, such as described with reference to FIG. 2E.

The market maturity engine 402 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The market maturity engine 402 can be implemented as a single software entity, or can be distributively implemented in multiple computers communicating with each other over a network, such as in a server farm.

5.0 Example Market Maturity Optimization Processes

Figure 5:
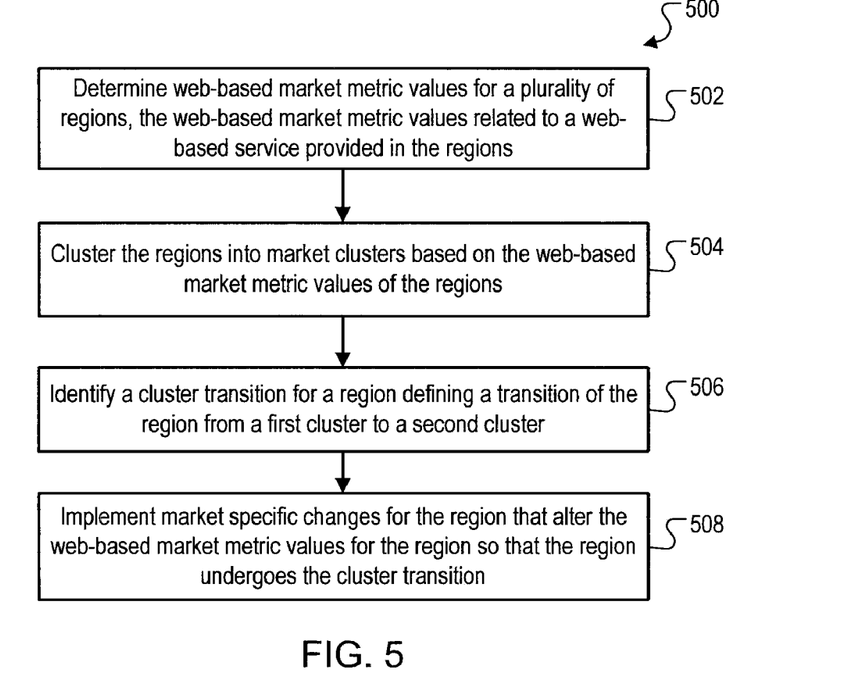
FIG. 5 is a flow diagram of an example process for optimizing a web-based service for a region.

FIG. 5 is a flow diagram of an example process 500 for optimizing a web-based service for a region. The process 500 can, for example, be implemented in the market maturity engine 402 of FIG. 4.

Stage 502 determines web-based market metric values for a plurality of regions, the web-based market metric values related to a web-based service provided in the regions. For example, the market maturity engine 402 can identify market factors/metric values stored in the data store 406 for entities, e.g., regions, countries, etc., identified by the data stored in the entities data store 404.

Stage 504 clusters the regions into market clusters based on the web-based market metric values of the regions. For example, the market maturity engine 402 can generate market clusters as described with reference to FIGS. 2A-2C and 3 above.

Stage 506 identifies a cluster transition for a region defining a transition of the region from a first cluster to a second cluster. For example, the market maturity engine 402 can identify a region, e.g., region 310, for which a cluster transition is desired, e.g., a transition from Market 2 to Market 1 as shown in FIG. 2C.

Stage 508 implements market-specific changes for the region that alter the web-based market metric values for the region so that the region undergoes the cluster transition. For example, the market maturity engine 402 may implement a quality standards change, or a bidding requirement change, etc., for the region. Performance of the region can be monitored to ensure that the market-specific changes are realizing the objective of transitioning the region from the from one market cluster to a target market cluster. For example, revenue generation can be measured as described with reference to FIG. 2E.

Figure 6:
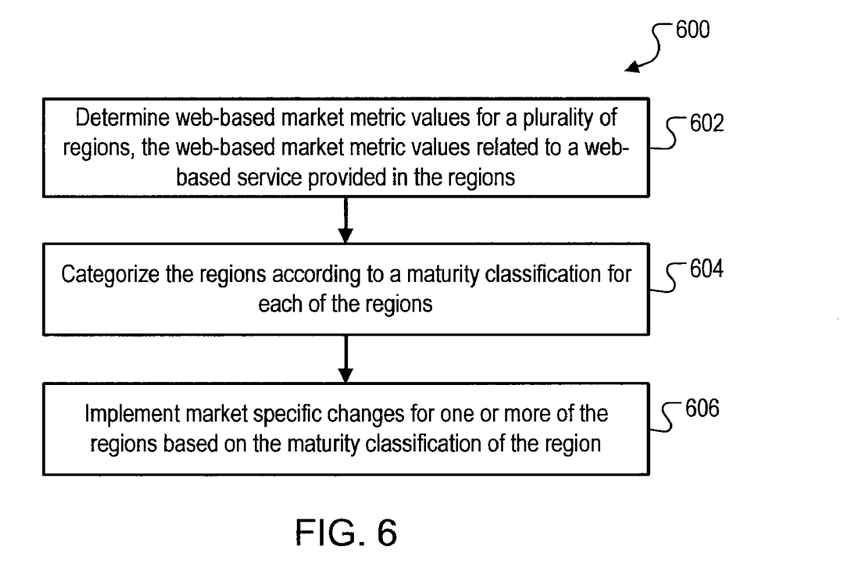
FIG. 6 is flow diagram of another example process for optimizing a web-based service for a region.

FIG. 6 is flow diagram of another example process 600 for optimizing a web-based service for a region. The process 600 can, for example, be implemented in the market maturity engine 402 of FIG. 4.

Stage 602 determines web-based market metric values for a plurality of regions, the web-based market metric values relate to a web-based service provided in the regions. For example, the market maturity engine 402 can access web-based market metric values stored in the market factor/metrics data store 406 for a plurality of regions. The web-based market metric values can be related to a web-based service, e.g., click-through rates, revenue rates, etc. for a web-based advertising service.

Stage 604 categorizes the regions according to a maturity classification for each of the regions. For example, the market maturity engine 402 can determine market maturity scores for each of the regions and categorize the region according to one of several levels of market maturity, or can perform a clustering algorithm to group the regions into market clusters.

Stage 606 implements market-specific changes for one or more of the regions based on the maturity classification of the region. For example, the market maturity engine 402 may implement a quality standards change, or a bidding requirement change, etc., for one or more of the regions region. Performance of the one or more regions can be monitored to ensure that the market-specific changes are realizing the objective of improving performance of the web-based services as measured by the web-based market metric values. For example, revenue generation can be measured as described with reference to FIG. 2E.

Figure 7:
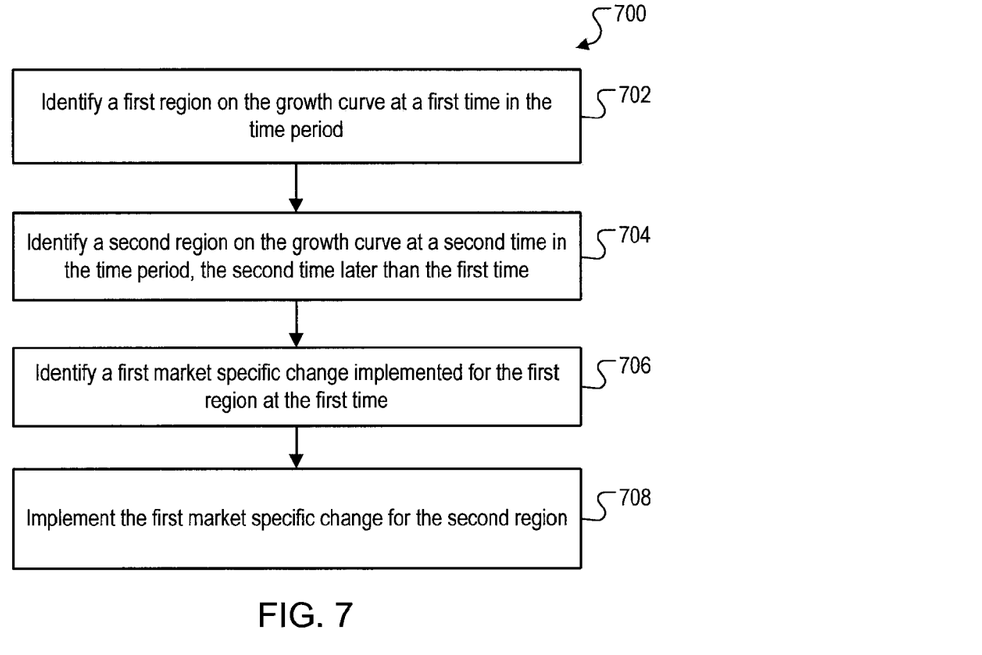
FIG. 7 is a flow diagram of an example process implementing a market-specific change.

FIG. 7 is a flow diagram of an example process 700 implementing a market-specific change. The process 700 can, for example, be implemented in the market maturity engine 402 of FIG. 4.

Stage 702 identifies a first region on the growth curve at a first time in the time period. For example, the market maturity engine 402 can identify a first country in the growth curve of Market 1 at the time 212.

Stage 704 identifies a second region on the growth curve at a second time in the time period, the second time later than the first time. For example, the market maturity engine 402 can identify a second country in the growth curve of Market 2 at the time 214.

Stage 706 identifies a first market-specific change implemented for the first region at the first time. For example, the market maturity engine 402 can identify the implementation of a quality based bidding process and a quality scoring process in the first region that occurred at the time 212.

Stage 708 implements the first market-specific change for the second region. For example, the market maturity engine 402 can implement the quality based bidding process and the quality scoring process in the second region at the time 214. Such implementation can, for example, cause the second region to transition to Market 1 during a future time period, e.g., during the time period between times 214 and 216 as depicted in FIG. 2C.

Figure 8:
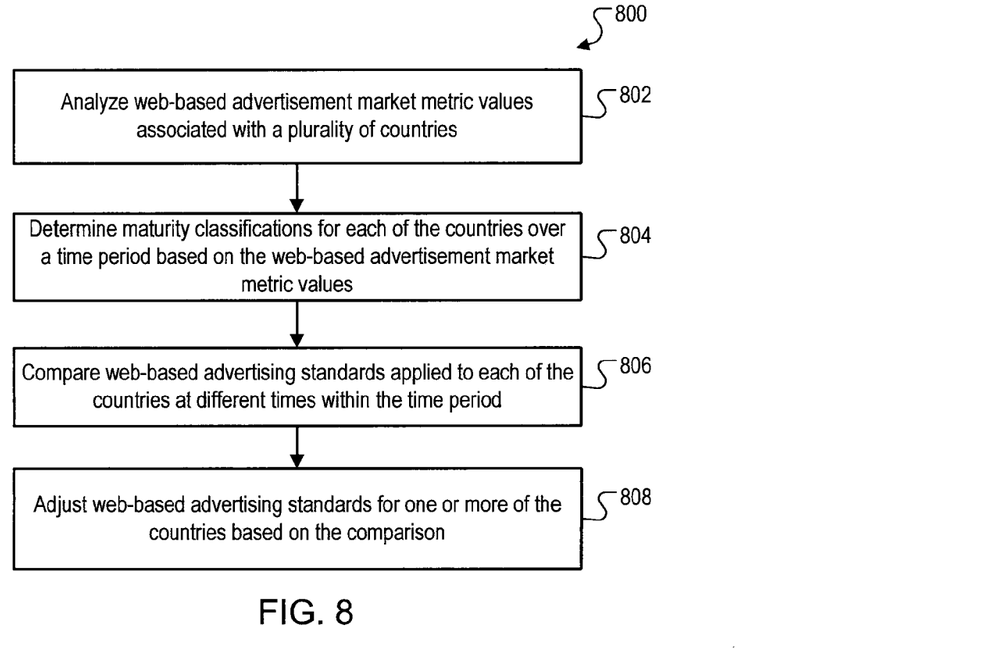
FIG. 8 is a flow diagram of another example process for optimizing a web-based advertising service for a region.

FIG. 8 is a flow diagram of another example process 800 for optimizing a web-based advertising service for a region. The process 800 can, for example, be implemented in the market maturity engine 402 of FIG. 4.

Stage 802 analyzes web-based advertisement market metric values associated with a plurality of countries. For example, the market maturity engine 402 can access web-based market metric values stored in the market factor/metrics data store 406 for a plurality of regions.

Stage 804 determines maturity classifications for each of the countries over a time period based on the web-based advertisement market metric values. For example, the market maturity engine 402 can determine market maturity scores for each of the regions over a time period and categorize the region according to one of several levels of market maturity, or can perform a clustering algorithm to group the regions into market clusters. A graphical representation of such categorization or clustering is shown in FIG. 2C.

Stage 806 compares web-based advertising standards applied to each of the countries at different times within the time period. For example, the market maturity engine 402 can compare the advertising standards applied to a first country at a first time, e.g., time 212, to the advertising standards applied to a second country at one or both of the first time 212 and a second time, e.g., time 214.

Stage 808 adjusts web-based advertising standards for one or more of the countries based on the comparison. For example, the market maturity engine 402 can implement a landing page evaluation process in the second country at the time 214 if the comparison of stage 806 indicates that such an implementation would likely improve performance of the web-based advertising service in the second country.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

What is claimed is:

1. A computer-implemented method, comprising:
   determining web-based market metric values for a plurality of regions, the web-based market metric values measuring the performance of advertising on the Web in the plurality of regions by an advertising service, wherein the web-based market metric values are selected from a group consisting of advertisement clicks, advertisement click-through rates, advertisement conversions, advertisement conversion rates, advertisement quality, advertisement costs per action, advertisement revenue rates, advertisement revenue per action, and computer web access penetration;
   clustering the regions into market clusters based at least in part on the similarity of web-based market metric values for each cluster;
   identifying a cluster transition for a region, the cluster transition defining a transition of the region from a first cluster to a second cluster; and
   implementing, by a computer system, market-specific changes for the region based on the particular identified cluster transition for the region and the web-based market metric values for the first cluster and the second cluster, wherein the market-specific changes are selected from a group consisting of adjustments to quality factors for serving advertisements, adjustments to bidding requirements for serving advertisements, adjustments to a pricing model for bidding on advertisements, adjustments to promotion of location of advertisements on Web pages, adjustments to keyword expansion for submitted search queries, offering an initial internet access subsidy, and adjustments to the initial internet access subsidy.

2. The method of claim 1, wherein determining web-based market metric values for the plurality of regions comprises determining one or more of advertisement click-through rates, advertisement conversion rates, or advertisement revenue rates.

3. The method of claim 2, wherein clustering the regions into the market clusters comprises clustering the regions based on substantially similar values of one or more of advertisement click-through rates, advertisement conversion rates, or advertisement revenue rates.

4. The method of claim 3, wherein each of the regions comprises a country.

5. The method of claim 1, wherein implementing market-specific changes for the region comprises implementing web-based service quality changes.

6. The method of claim 5, wherein implementing web-based service quality changes comprises adjusting advertisement quality bidding requirements for advertisements.

7. The method of claim 5, wherein implementing web-based service quality changes comprises adjusting minimum advertisement bidding requirements.

8. A computer-implemented method, comprising:
   determining web-based market metric values for a plurality of regions, the web-based market metric values measuring performance of advertising on the Web in the plurality of regions by an advertising service, wherein the web-based market metric values are selected from a group consisting of advertisement clicks, advertisement click-through rates, advertisement conversions, advertisement conversion rates, advertisement quality, advertisement costs per action, advertisement revenue rates, advertisement revenue per action, and computer web access penetration;
   categorizing the regions according to a maturity classification, wherein the maturity classification is based at least in part on the web-based market metric values;
   identifying a transition for one or more of the regions, the transition defining a transition of the one or more of the regions from a first maturity classification to a second maturity classification; and
   implementing, by a computer system, market-specific changes for the one or more of the regions, wherein the market-specific changes for the one or more of the regions are based on the particular identified transition for the one or more of the regions and the web-based market metric values required to be classified in each of the first maturity classification and the second maturity classification, and wherein the market-specific changes are selected from a group consisting of adjustments to quality factors for serving advertisements, adjustments to bidding requirements for serving advertisements, adjustments to a pricing model for bidding on advertisements, adjustments to promotion of location of advertisements on Web pages, adjustments to keyword expansion for submitted search queries, offering an initial internet access subsidy, and adjustments to the initial internet access subsidy.

9. The method of claim 8, wherein determining web-based market metric values for the plurality of regions comprises determining one or more of advertisement click-through rates, advertisement conversion rates, or advertisement revenue rates.

10. The method of claim 9, wherein each of the regions comprises a country.

11. The method of claim 8, wherein implementing market-specific changes for the one or more of the regions comprises implementing web-based service quality changes for each of the one or more of the regions.

12. The method of claim 11, wherein implementing web-based service quality changes comprises adjusting advertisement quality bidding requirements for advertisements in each of the one or more of the regions.

13. The method of claim 8, wherein:
   categorizing the regions according to a maturity classification for each of the regions comprises categorizing the regions according to a growth curve for a time period; and
   implementing market-specific changes for the one or more of the regions comprises:
      identifying a first region on the growth curve at a first time in the time period;
      identifying a second region on the growth curve at a second time in the time period, the second time later than the first time;
      identifying a first market-specific change implemented for the first region at the first time; and
      implementing the first market-specific change for the second region.

14. The method of claim 13, wherein the performance measured of the first region at the first time and the second region at the second time are substantially equal.

15. A computer-implemented method, comprising:
analyzing web-based advertisement market metric values associated with a plurality of countries, the web-based advertisement market metric values measuring performance of advertising on the Web in the plurality of countries by an advertising service, wherein the web-based advertisement market metric values are selected from a group consisting of advertisement clicks, advertisement click-through rates, advertisement conversions, advertisement conversion rates, advertisement quality, advertisement costs per action, advertisement revenue rates, advertisement revenue per action, and computer web access penetration;
determining maturity classifications for each of the countries over a time period, wherein the maturity classifications are based at least in part on the web-based advertisement market metric values;
identifying a first country classified according to a first maturity classification at a first time in the time period;
identifying a second country classified according to a second maturity classification at the first time, the second maturity classification indicating a less mature maturity classification;
identifying a second time in the time period when the first country is classified according to the second maturity classification, the second maturity classification at the second time and the second maturity classification of the second country at the first time indicating a substantially similar performance level;
identifying a web-based advertising standards adjustment that had been applied to the first country and caused the first country to transition from the second maturity classification to the first maturity classification; and
applying, by a computer system, the web-based advertising standards adjustment to the second country, wherein the web-based advertising standards adjustment comprises at least one of adjusting quality factors for serving advertisements, adjusting bidding requirements for serving advertisements, adjusting a pricing model for bidding on advertisements, adjusting promotion of location of advertisements on Web pages, and adjusting keyword expansion for submitted search queries.

16. The method of claim 15, wherein the web-based advertising standards adjustment comprises adjusting quality factors for serving advertisements.

17. The method of claim 15, wherein the web-based advertisement market metric values comprise one or more of an aggregate advertisement click-through rate, an aggregate advertisement conversion rate, or an aggregate advertisement revenue rate.

18. A system, comprising:
one or more computers and one or more non-transitory computer readable storage media storing instructions that when executed by the one or more computers cause the one or more computers to perform operations comprising:
determining web-based market metric values for a plurality of regions, the web-based market metric values measuring the performance of advertising on the Web in the plurality of regions by an advertising service, wherein the web-based market metric values are selected from a group consisting of advertisement clicks, advertisement click-through rates, advertisement conversions, advertisement conversion rates, advertisement quality, advertisement costs per action, advertisement revenue rates, advertisement revenue per action, and computer web access penetration;
clustering the regions into market clusters based at least in part on the similarity of web-based market metric values for each cluster;
identifying a cluster transition for a region, the cluster transition defining a transition of the region from a first cluster to a second cluster; and
implementing market-specific changes for the region based on the particular identified cluster transition for the region and the web-based market metric values for the first cluster and the second cluster, wherein the market-specific changes are selected from a group consisting of adjustments to quality factors for serving advertisements, adjustments to bidding requirements for serving advertisements, adjustments to a pricing model for bidding on advertisements, adjustments to promotion of location of advertisements on Web pages, adjustments to keyword expansion for submitted search queries, offering an initial internet access subsidy, and adjustments to the initial internet access subsidy.

19. A system, comprising:
one or more computers and one or more non-transitory computer readable storage media storing instructions that when executed by the one or more computers cause the one or more computers to perform operations comprising:
determining web-based market metric values for a plurality of regions, the web-based market metric values measuring performance of advertising on the Web in the plurality of regions by an advertising service, wherein the web-based market metric values are selected from a group consisting of advertisement clicks, advertisement click-through rates, advertisement conversions, advertisement conversion rates, advertisement quality, advertisement costs per action, advertisement revenue rates, advertisement revenue per action, and computer web access penetration;
categorizing the regions according to a maturity classification, wherein the maturity classification is based at least in part on the web-based market metric values;
identifying a transition for one or more of the regions, the transition defining a transition of the one or more of the regions from a first maturity classification to a second maturity classification; and
implementing market-specific changes for the one or more of the regions, wherein the market-specific changes for the one or more of the regions are based on the particular identified transition for the one or more of the regions and the web-based market metric values required to be classified in each of the first maturity classification and the second maturity classification, and wherein the market-specific changes are selected from a group consisting of adjustments to quality factors for serving advertisements, adjustments to bidding requirements for serving advertisements, adjustments to a pricing model for bidding on advertisements, adjustments to promotion of location of advertisements on Web pages, adjustments to keyword expansion for submitted search queries, offering an initial internet access subsidy, and adjustments to the initial internet access subsidy.

20. A system, comprising:
one or more computers and one or more non-transitory computer readable storage media storing instructions that when executed by the one or more computers cause the one or more computers to perform operations comprising:

analyzing web-based advertisement market metric values associated with a plurality of countries, the web-based advertisement market metric values measuring performance of advertising on the Web in the plurality of countries by an advertising service, wherein the web-based advertisement market metric values are selected from a group consisting of advertisement clicks, advertisement click-through rates, advertisement conversions, advertisement conversion rates, advertisement quality, advertisement costs per action, advertisement revenue rates, advertisement revenue per action, and computer web access penetration;

determining maturity classifications for each of the countries over a time period, wherein the maturity classifications are based at least in part on the web-based advertisement market metric values;

identifying a first country classified according to a first maturity classification at a first time in the time period;

identifying a second country classified according to a second maturity classification at the first time, the second maturity classification indicating a less mature maturity classification;

identifying a second time in the time period when the first country is classified according to the second maturity classification, the second maturity classification at the second time and the second maturity classification of the second country at the first time indicating a substantially similar performance level;

identifying a web-based advertising standards adjustment that had been applied to the first country and caused the first country to transition from the second maturity classification to the first maturity classification; and applying the web-based advertising standards adjustment to the second country, wherein the web-based advertising standards adjustment comprises at least one of adjusting quality factors for serving advertisements, adjusting bidding requirements for serving advertisements, adjusting a pricing model for bidding on advertisements, adjusting promotion of location of advertisements on Web pages, and adjusting keyword expansion for submitted search queries.

* * * * *